United States Patent [19]

Nagai et al.

[11] Patent Number: 4,672,665

[45] Date of Patent: Jun. 9, 1987

[54] ECHO CANCELLER

[75] Inventors: Kiyotaka Nagai, Hirakata; Ryoji Suzuki, Neyagawa; Akitoshi Yamada, Daito, all of Japan

[73] Assignee: Matsushita Electric Industrial Co. Ltd., Osaka, Japan

[21] Appl. No.: 758,806

[22] Filed: Jul. 25, 1985

[30] Foreign Application Priority Data

Jul. 27, 1984 [JP] Japan .................................. 59-157851
Mar. 8, 1985 [JP] Japan .................................. 60-47166

[51] Int. Cl.⁴ ............................................ H04B 3/20
[52] U.S. Cl. ..................................... 379/411; 379/410
[58] Field of Search ................ 179/170.2, 170.6, 170.8; 370/32

[56] References Cited

FOREIGN PATENT DOCUMENTS 58-31129  4/1983  Japan .
83/01716  5/1983  PCT Int'l Appl. .............. 179/170.2

OTHER PUBLICATIONS

"An Adaptive Echo Canceller with Variable Step Gain Method", Yamamoto et al., The Transaction of the IECE of Japan, vol. E 65, No. 1, Jan. 1982, pp. 1-8.

Primary Examiner—Gene Z. Rubinson
Assistant Examiner—R. Vaas
Attorney, Agent, or Firm—Spencer & Frank

[57] ABSTRACT

An echo canceller includes means for reducing correlation in a receiving side input signal based on a linear prediction model by regarding the receiving side input signal as an output signal of the linear prediction model. This means for reducing correlation is provided in a form suitable for hardware implementation, and thus, a convergence rate for the receiving side input signal having strong correlation as a speech signal can be improved without substantially increasing the number of calculations or the amount of memory.

6 Claims, 14 Drawing Figures

ECHO CANCELLER

BACKGROUND OF THE INVENTION

1. Field of the Invention

The present invention relates to an echo canceller used for cancelling an echo signal generated due to impedance mismatching of a circuit converter in a two-wire circuit and a four-wire circuit in a telephone circuit, and for improving the speech quality of a long distance telephone circuit.

2. Description of the Prior Art

Conventionally, as an adaptive estimating algorithm for echo cancellers, an algorithm based on a learning identification method has widely been used.

In an echo canceller based on the learning identification method, a satisfactory convergence characteristic can be obtained when a signal having no correlation as in a white noise signal is inputted. However, when a signal having strong correlation such as a speech signal is inputted, a problem arises in which it takes a long convergence time.

As an echo canceller for solving such a problem, the arrangement disclosed in Japanese Patent Publication No. 58-31129 (1983) is known.

FIG. 1 is a block diagram showing the arrangement of a conventional echo canceller. In FIG. 1, reference numeral 1 designates a receiving side input terminal, 2 a receiving side output terminal, 3 a transmitting side input terminal, 4 a transmitting side output terminal, 5 a linear prediction coefficient calculator, 6 a first linear prediction inverse filter, 7 a first register, 8 a second linear prediction inverse filter, 9 a second register, 10 a first convolver, 11 a first subtracter, 12 a corrector, 13 a third register, 14 a second convolver, and 15 designates a second subtracter.

With regard to the echo canceller arranged as described above, the operation and problem associated therewith will be described hereinafter.

In the following description, it is assumed that signals within the echo canceller have been sampled in time and hence these signals are discrete time signals, and a sampler and a hold circuit required for this purpose will be omitted in the following description since these circuits are well known.

Now supposing that, at a time j, a receiving side input signal is $x_j$, a transmitting side input signal is $y_j$, and a transmitting side output signal is $e_j$. Further, it is assumed that a signal vector $X_j$ of the receiving side input signals is expressed by equation (1), and an estimated impulse response $H_j$ of an echo path is expressed by equation (2).

$$X_j = (x_j, x_{j-1}, \ldots, x_{j-(N-1)})' \qquad (1)$$

$$\hat{H}_j = (\hat{h}_{0j}, \hat{h}_{1j}, \ldots, \hat{h}_{N-1j}), \qquad (2)$$

where, N represents the number of samples of the impulse response, and the symbol ' (dash) represents transposition of a vector.

When a receiving side input signal having a predetermined time length is inputted, in the linear prediction coefficient calculator 5, linear prediction coefficients $a_i$ ($i = 1, 2, \ldots, M$) of the receiving side input signal are obtained based upon of an M-th order linear prediction model. The linear prediction coefficients are calculated by, for example, Durbins method.

In the first linear prediction inverse filter 6, a prediction error signal $\tilde{x}_j$ of the receiving side input signal is produced by performing linear prediction inverse filtering as shown in equation (3) by using the linear prediction coefficients calculated in the linear prediction coefficient calculator 5 and the receiving side input signal.

$$\tilde{x}_j = x_j - \sum_{i=1}^{M} a_i x_{j-1} \qquad (3)$$

In the first register 7, a signal vector $\tilde{X}_j$ of the prediction error signals of the receiving side input signal obtained in the above manner is stored in the form of equation (4).

$$\tilde{X}_j = (\tilde{x}_j, \tilde{x}_{j-1}, \ldots \tilde{x}_{j-(N-1)})' \qquad (4)$$

In the second linear prediction inverse filter 8, a prediction error signal $\tilde{y}_j$ of a transmitting side input signal is produced by performing linear prediction inverse filtering as shown in equation (5) by using the linear prediction coefficient and the transmitting side input signal.

$$\tilde{y}_j = y_j - \sum_{i=1}^{M} a_i y_{j-i} \qquad (5)$$

Next, an estimated value $\hat{y}_i$ of a prediction error signal of an echo signal is obtained in the first convolver 10 by convolving, as shown in equation (6), the content of the second register 9 storing the estimated impulse response in the form of equation (2) with the content of the first register 7.

$$\hat{\tilde{y}}_j = \hat{H}_j \tilde{X}_j \qquad (6)$$

In the first subtracter 11, a prediction error signal $\tilde{e}_j$ is produced by subtracting the estimated value of the prediction error signal of the echo signal from the prediction error signal of the transmitting side input signal as shown in equation (7).

$$\tilde{e}_j = \tilde{y}_j - \hat{\tilde{y}}_j \qquad (7)$$

In the corrector 12, the content of the second register 9, that is, the estimated impulse response is corrected in accordance with the algorithm of the learning identification method as shown in equation (8).

$$\hat{H}_{j+1} = \hat{H}_j + \alpha \frac{\tilde{X}_j \tilde{e}_j}{||\tilde{X}_j||^2} \qquad (8)$$

where, $\alpha$ is a constant in a range $0 < \alpha < 2$, and $||\tilde{X}_j||$ represents the Euclidian norm of $\tilde{X}_j$.

In the second convolver 14, an estimated echo signal $\hat{y}_j$ is produced by convolving, as shown in equation (9), the content of the second register 9 with the content of the third register 13 storing the signal train $X_j$ of the receiving side input signals in the form of equation (1).

$$\hat{y}_j = \hat{H}_j X_j \qquad (9)$$

In the second subtracter 15, by subtracting the estimated echo signal from the transmitting side input signal as shown in equation (10), a transmitting side output signal is produced, and this transmitting side output signal is outputted to the transmitting side output terminal 4.

$$e_j = y_j - \hat{y}_j \quad (10)$$

The receiving side input signal is outputted, as it is, to the receiving side output terminal 2.

The foregoing description is made as to the operation of the echo canceller arranged as shown in FIG. 1, in which by reducing the correlation in the receiving side input signal based on the linear prediction model, a good convergence characteristic can be obtained even for a receiving side input signal having strong correlation.

However, in the echo canceller arranged as shown in FIG. 1, there is a problem in that the number of calculations and the amount of memory are increased as compared with an echo canceller in accordance with a normal learning identification method.

Hereinafter, the number of calculations and the amount of memory will be evaluated concretely. First, the number of calculations will be evaluated in view of the number of multiplications per sampling period. In the echo canceller arranged as shown in FIG. 1, supposing that the calculations of the linear prediction coefficients are performed in accordance with the Durbin's method the number of multiplications per sampling period is about $(3N+4M+M^2/N)$. On the other hand, in the echo canceller according to the normal learning identification method, the number of multiplications per sampling period is 2N. Here, assuming that $N=320$ and $M=5$, if the ratio of the number of multiplications of the echo canceller arranged as FIG. 1 to that of the echo canceller according to the normal learning identification method is obtained, this ratio will be 1.53. In other words, in the echo canceller arranged as in FIG. 1, it is required to improve the calculation capability by 50% due to the introduction of the linear prediction model as compared with the case in which the above-mentioned model is not introduced.

Next, the amount of memory will be evaluated concretely. In the echo canceller arranged as in FIG. 1, the major part of the required amount of memory is occupied by three registers each having a length of N. In contrast, in the echo canceller according to the normal learning identification method, two registers each having the length N are required. Therefore, the echo canceller arranged as in FIG. 1 is required to increase the amount of memory by about 50% due to the introduction of the linear prediction model as compared with the case in which the above-mentioned model is not introduced.

As described in the foregoing, in the echo canceller arranged as in FIG. 1, by reducing the correlation in the receiving side input signal based on the linear prediction model, a good convergence characteristic can be obtained even for a receiving side input signal having strong correlation. However, there is a problem in that the number of calculations and the amount of memory must be increased due to the introduction of the linear prediction model.

SUMMARY OF THE INVENTION

The object of the present invention is to provide a means for solving the above-mentioned problem, and to provide an echo canceller in which the convergence characteristic is improved for a receiving side input signal having strong correlation as in case of a speech signal by incorporating means for reducing the correlation based on the linear prediction model by regarding the receiving side input signal as an output signal of the linear prediction model, without substantially increasing the number of calculations or the amount of memory.

DESCRIPTION OF THE PREFERRED EMBODIMENTS

Figure 2:
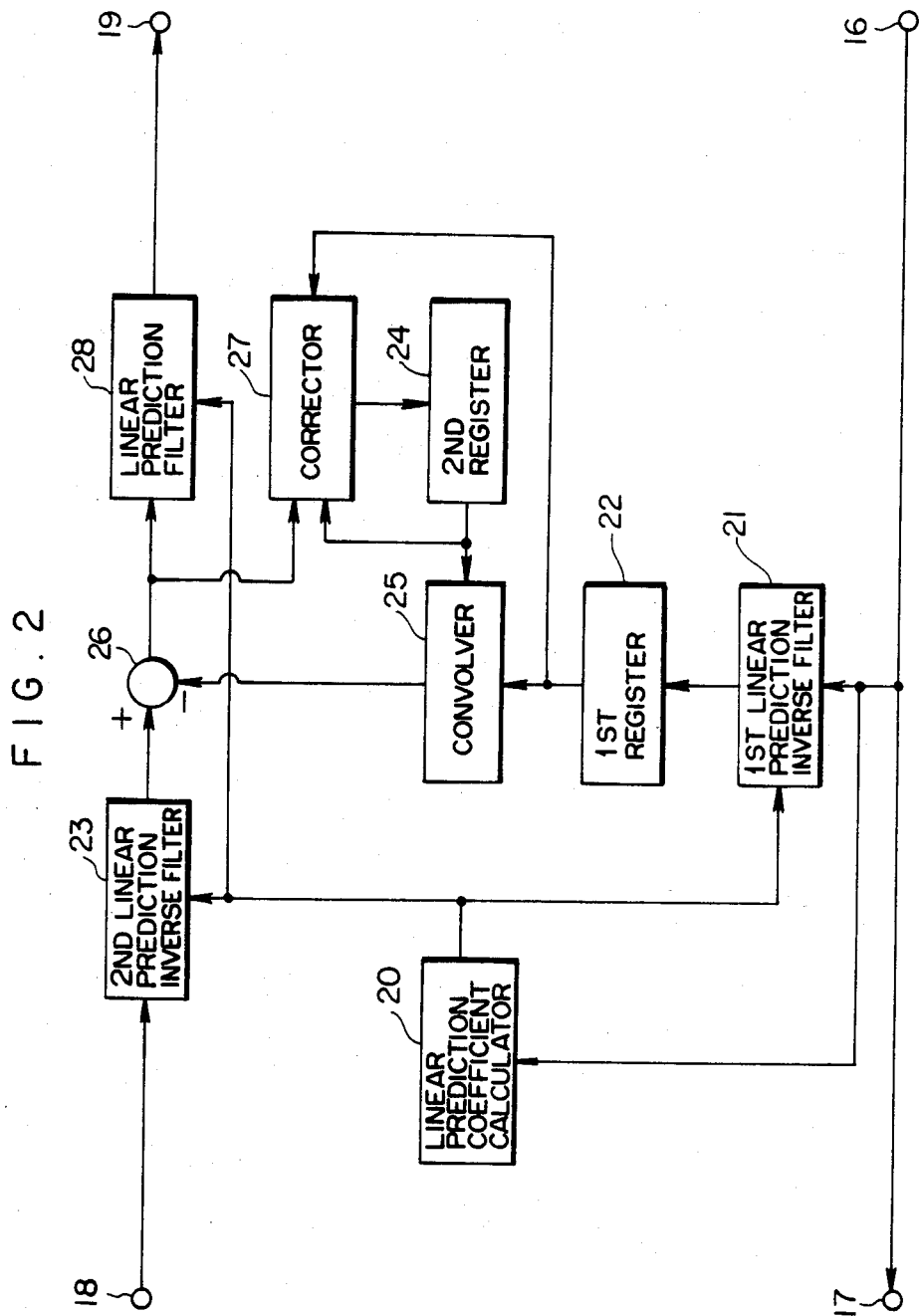
FIG. 2 is a block diagram of an echo canceller of a first embodiment according to the present invention.

FIG. 2 shows an arrangement of an echo canceller in a first embodiment of the present invention. In FIG. 2, reference numeral 16 designates a receiving side input terminal, 17 a receiving side output terminal, 18 a transmitting side input terminal, 19 a transmitting side output terminal, 20 a linear prediction coefficient calculator, 21 a first linear prediction inverse filter, 22 a first register, 23 a second linear prediction inverse filter, 24 a second register, 25 a convolver, 26 a subtracter, 27 a corrector, and 28 designates a linear prediction filter.

The operation of the echo canceller arranged as mentioned above will be described hereinafter.

Figure 3:
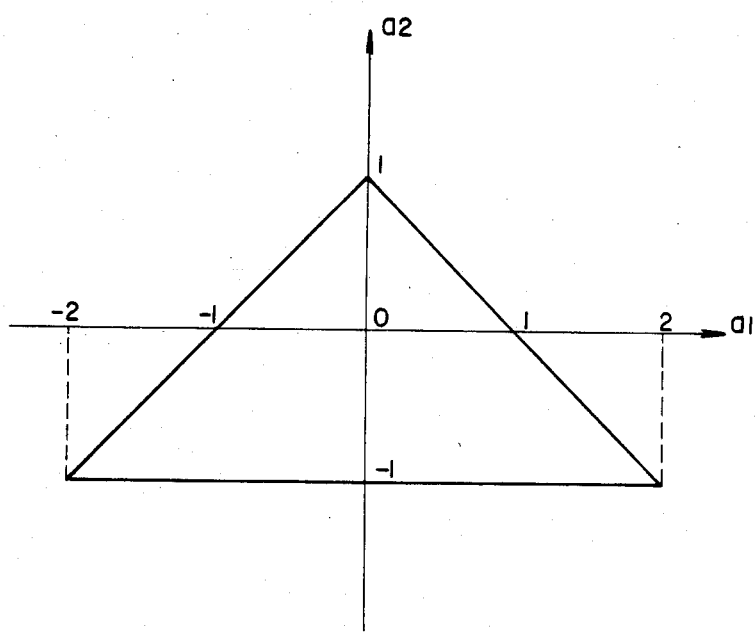
FIG. 3 is a graph showing a stable region of a second order linear prediction coefficient.

When a receiving side input signal of a predetermined time length is inputted, in the linear prediction coefficient calculator 20, regarding the receiving side input signal as an output signal of an M-th order linear prediction model, linear prediction coefficients $a_i$ ($i=1,2,\ldots,M$) of the receiving side input signal are obtained. The linear prediction coefficients, are calculated by for example, Durbin's method. In the linear prediction coefficient calculator 20, after calculating the linear prediction coefficients, the stability of a linear prediction filter using the linear prediction coefficients mentioned above is checked. When it is found to be unstable, the values of the linear prediction coefficients are changed over to stable values. In order to operate the linear prediction filter stably, all poles of the filter must exist within a unit circle on the Z-plane. Accordingly, by limiting values of the linear prediction coefficients so that all the poles exist within the unit circle, stable operation of the linear prediction filter is insured. For example, when M=2, if values of $a_1$ and $a_2$ exist within the triangular region shown in FIG. 3, the linear prediction filter will operate stably. Conversely, if the values of $a_1$ and $a_2$ exist outside the above-mentioned region, by forcibly changing over the values of $a_1$ and $a_2$ to values within that region, stable operation is insured.

In the first linear prediction inverse filter 21, linear prediction inverse filtering is performed a shown in equation (11) by using the linear prediction coefficients obtained in the manner described above and the receiving side input signal, and a prediction error signal $\tilde{x}_j$ of the receiving side input signal is produced.

$$\tilde{x}_j = x_j - \sum_{i=1}^{M} a_i x_{j-i} \tag{11}$$

Figure 4:
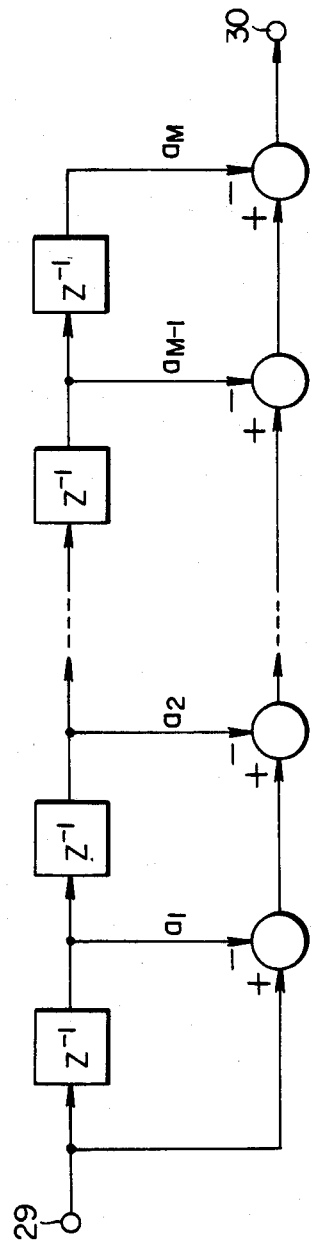
FIG. 4 is a signal flow diagram in a linear prediction inverse filter using the linear prediction coefficients.

FIG. 4 is a signal flow diagram in the linear prediction inverse filter using the linear prediction coefficients. In FIG. 4, reference numeral 29 designates a signal input terminal, 30 designates a prediction error signal output terminal, and letter $Z^{-1}$ designates a unit delay of the sampling period (this representation is common to other signal flow diagrams described hereinafter). A system function P(Z) of the linear prediction inverse filter of FIG. 4 is expressed by equation (12).

$$P(Z) = 1 - \sum_{i=1}^{M} a_i Z^{-i} \tag{12}$$

In the first register 22, a signal vector $\tilde{X}_j$ of the prediction error signals of the receiving side input signal obtained in the manner described above is stored in the form of equation (4).

In the second linear prediction inverse filter 23, a prediction error signal $\tilde{y}_j$ of a transmitting side input signal is produced by performing linear prediction inverse filtering as shown in equation (13) by using the linear prediction coefficients calculated in the linear prediction coefficient calculator 20 and the transmitting side input signal.

$$\tilde{y}_j = y_j - \sum_{i=1}^{M} a_i y_{j-i} \tag{13}$$

Next, the content of the first register 22 and the content of the second register 24 storing the estimated impulse response of the echo path in the form of equation (2) are convolved as shown in equation (14) by using the convolver 25, and an estimated value $y_j$ of the prediction error signal of the echo signal is produced.

$$\hat{\tilde{y}}_j = \hat{H}_j \tilde{X}_j \tag{14}$$

In the subtracter 26, a prediction error signal $\tilde{e}_j$ of the transmitting side output signal is produced by subtracting the above-mentioned prediction error signal of the echo signal from the prediction error signal of the transmitting side input signal as shown in equation (15).

$$\tilde{e}_j = \tilde{y}_j - \hat{\tilde{y}}_j \tag{15}$$

In the corrector 27, in accordance with the algorithm of a learning identification method shown in equation (16), the content of the second register 24 is corrected by using the contents of the first register 22 and second register 24 and by using the prediction error signal of the transmitting side output signal, and the estimated impulse response is corrected in sequence. In equation (16), $\alpha$ is a constant in a range $0<\alpha<2$.

$$\hat{H}_{j+1} = \hat{H}_j + \alpha \frac{\tilde{X}_j \tilde{e}_j}{||\tilde{X}_j||^2} \tag{16}$$

In the linear prediction filter 28, linear prediction filtering is performed as shown in equation (17) by using the linear prediction coefficients obtained in the linear prediction coefficient calculator 20 and the prediction error signal of the transmitting side output signal, and produces a transmitting side output signal.

$$e_j = \tilde{e}_j + \sum_{i=1}^{M} a_i e_{j-i} \tag{17}$$

Figure 5:
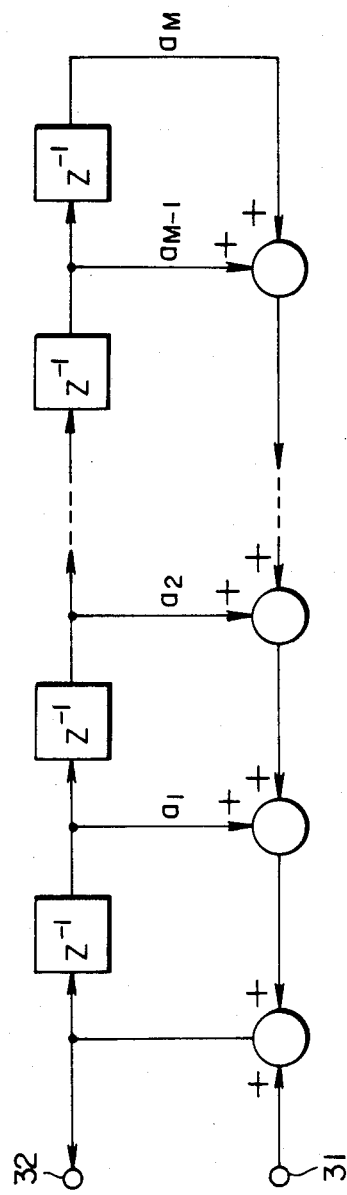
FIG. 5 is a signal flow diagram in a linear prediction filter using the linear prediction coefficients.

FIG. 5 shows a signal flow diagram in the linear prediction filter using the linear prediction coefficients. In FIG. 5, reference numeral 31 designates a prediction error signal input terminal, and 32 designates a signal output terminal. A system function Q(Z) of the linear prediction filter shown in FIG. 5 is expressed by equation (18).

$$Q(Z) = \frac{1}{1 - \sum_{i=1}^{M} a_i z^{-i}} = \frac{1}{P(Z)} \tag{18}$$

As shown in equation (18), this linear prediction filter is an all-pole type filter, and thus the insurance of the stability of the linear prediction coefficients as described in the operation of the linear prediction coefficient calculator 20 is necessary.

Generally, when a filter is inserted, since the signal is delayed, a delay in the adaptive control is caused depending on the insertion position of the filter, and the operation may even become unstable. However, in the present embodiment, no filter exists within the adaptive control loop, that is, within the loop required to calculate equation (16), and all the filters exist outside of the loop. Accordingly, unstable operation due to the delay in the adaptive control does not occur.

The foregoing is a description of the operation of the first embodiment.

Next, the number of calculations in the first embodiment will be evaluated under the same condition as the one used in evaluating the number of calculations in the conventional example. In the first embodiment, the number of calculations per sampling period is about $(2N+5M+M^2/N)$. As a result, supposing that $N=320$, and $M=5$, when the ratio of the number of multiplications of the echo canceller of the first embodiment to that of the echo canceller according to the normal learning identification method, the ratio of 1.04 is obtained. In other words, the echo canceller of the first embodiment can be realized with substantially the same degree of the number of multiplications as that of the echo canceller according to the normal learning identification method.

Figure 1:
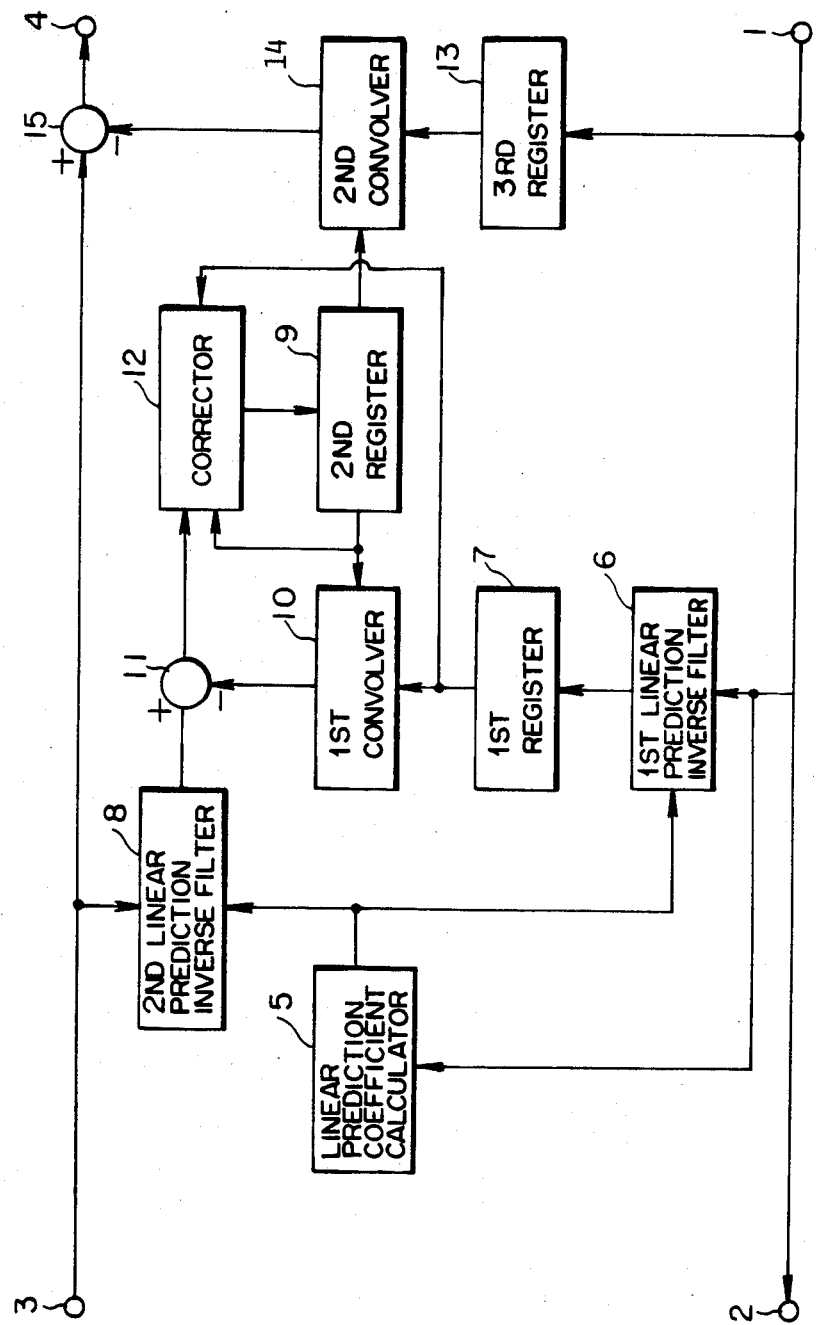
FIG. 1 is a block diagram of a conventional echo canceller.

Next, the amount of memory required to realize the echo canceller of the first embodiment will be evaluated. In the first embodiment, a total of 3N memories including two registers each having a length N and N memories in the prediction coefficient calculator 20 for storing the receiving side input signal constitute the major part of the memories required. Therefore, in the first embodiment, about the same amount of memory is required as in the conventional echo canceller of FIG. 1.

As described in the foregoing, the echo canceller in the first embodiment can exhibit a good convergence characteristic even for a receiving side input signal having strong correlation as is the case in a speed signal, by incorporating a means for reducing the correlation in the receiving side input signal based on the linear prediction model, without substantially increasing the number of calculations.

Figure 6:
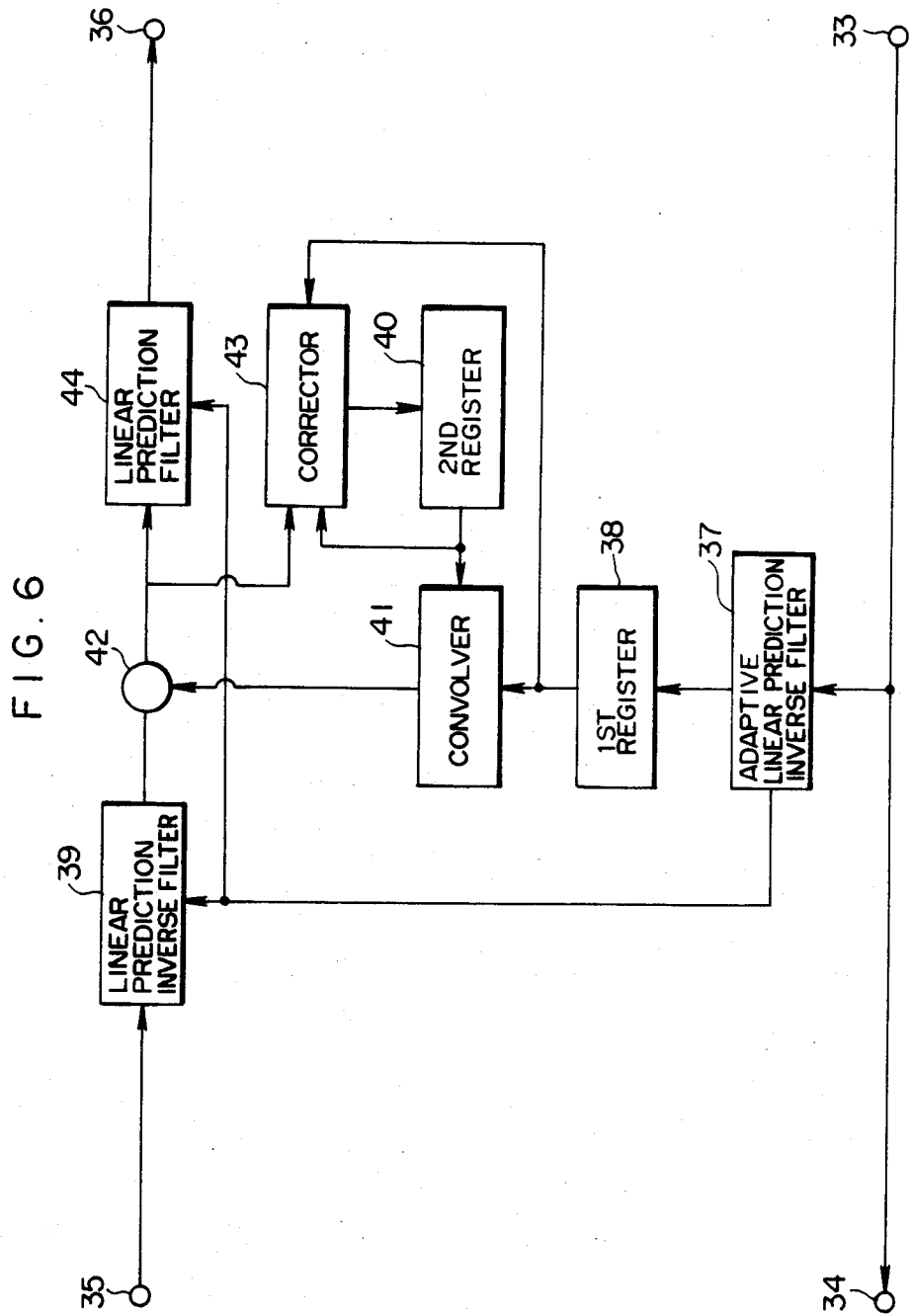
FIG. 6 is a block diagram of an echo canceller of a second embodiment according to the present invention.

Hereinafter, a second embodiment will be described with reference to the drawings. FIG. 6 is a block diagram of an arrangement of an echo canceller of the second embodiment. In FIG. 6, reference numeral 33 designates a receiving side input terminal, 34 a receiving side output terminal, 35 a transmitting side input terminal, 36 a transmitting side output terminal, 37 an adaptive linear prediction inverse filter, 38 a first register, 39 a linear prediction inverse filter, 40 a second register, 41 a convolver, 42 a subtracter, 43 a corrector, and 44 designates a linear prediction filter.

The arrangement in the second embodiment in FIG. 6 is the same as the first embodiment of FIG. 2 with the exception that the adaptive linear prediction inverse filter 37 is used in place of the linear prediction coefficient calculator 20 and the first linear prediction inverse filter 21.

Comparing the operation principle of the first embodiment with that of the second embodiment, although both are identical insofar as the reduction of the correlation in the receiving side input signal is done based on the linear prediction method, both differ from each other in the calculation method of the linear prediction coefficients. In other words, in the first embodiment, the linear prediction coefficients are obtained in the linear prediction coefficient calculator 20 by using the receiving side input signal of a predetermined time length during which the linear prediction coefficients are assumed to be constant. In contrast in the second embodiment, a difference from the first embodiment resides in that the adaptive linear prediction inverse filter 37 is used, and the linear prediction coefficients are obtained by estimating in every sampling period so that a prediction error signal of the receiving side input signal which is the output signal of the adaptive linear prediction inverse filter 37 is minimized.

Hereinafter, a difference in the operation in the second embodiment from the first embodiment, that is, the operation of the adaptive linear prediction inverse filter 37 will be described.

The adaptive linear prediction inverse filter 37 performs the linear prediction inverse filtering which removes the correlation contained in the receiving side input signal by using the receiving side input signal and the linear prediction coefficients, and which produces the prediction error signal of the receiving side input signal, and at the same time, the adaptive linear prediction inverse filter 37 calculates the linear prediction coefficients in sequence so as to minimize the prediction error signal of the receiving side input signal.

An arrangement to realize the linear prediction inverse filtering is the same as the signal flow diagram in FIG. 4. The calculations of the linear prediction coefficients are performed by correcting in sequence the linear prediction coefficients in accordance with equation (19) to minimise the prediction error signal of the receiving side input signal.

$$a_{ij+1} = a_{ij} = \beta \frac{\tilde{X}_j X_{j-i}}{\sum_{i=1}^{M} X_{j-i}^2} \quad (1 \leq i \leq M) \tag{19}$$

In equation (19), $a_{ij}$ represents the i-th order of linear prediction coefficient $a_i$ at a time j, and $\beta$ is a constant in the range $0 < \beta < 2$.

In this case, although the learning identification method is used as an algorithm for calculating the linear prediction coefficients in sequence, other algorithms such as a steepest descent method and the like may be used. As will be apparent by comparing equation (16) with equation (19), the algorithm for calculating the linear prediction coefficients is the same as the algorithm for estimating the impulse response of the echo canceller main body and therefore, there is an advantage in that in the second embodiment, common hardware and software can be used for both the takes. Further, in the first embodiment, memories are required within the linear prediction coefficient calculator 20 to store a predetermined number of receiving side input signals. In contrast in the second embodiment, since the calculations are carried out in sequence, such memories are not required, and thus the amount of memory can be saved.

Next, the number of calculations and the amount of memory in the second embodiment will be evaluated under the same condition as in the first embodiment. In the second embodiment the number of calculations per sampling period is about (2N+4M), and thus the echo canceller according to the second embodiment can be realized with substantially the samed degree of number of calculations as the echo canceller according to the normal learning identification method. Further, the major part of the memory required to realize the second embodiment is occupied by two registers each having a length N, and thus, also with respect to the amount of memory, the echo canceller according to the second embodiment can be realized with substantially the same degree as the echo canceller according to the normal learning identification method.

As described in the foregoing, the echo canceller of the second embodiment can exhibit a good convergence characteristic for the receiving side input signal having strong correlation as in case of a speech signal, by providing a means for reducing the correlation of the receiving side input signal based on the linear prediction model, without substantially increasing the number of calculations and the amount of memory.

A third embodiment will be described with reference to the drawings hereinafter.

Figure 7:
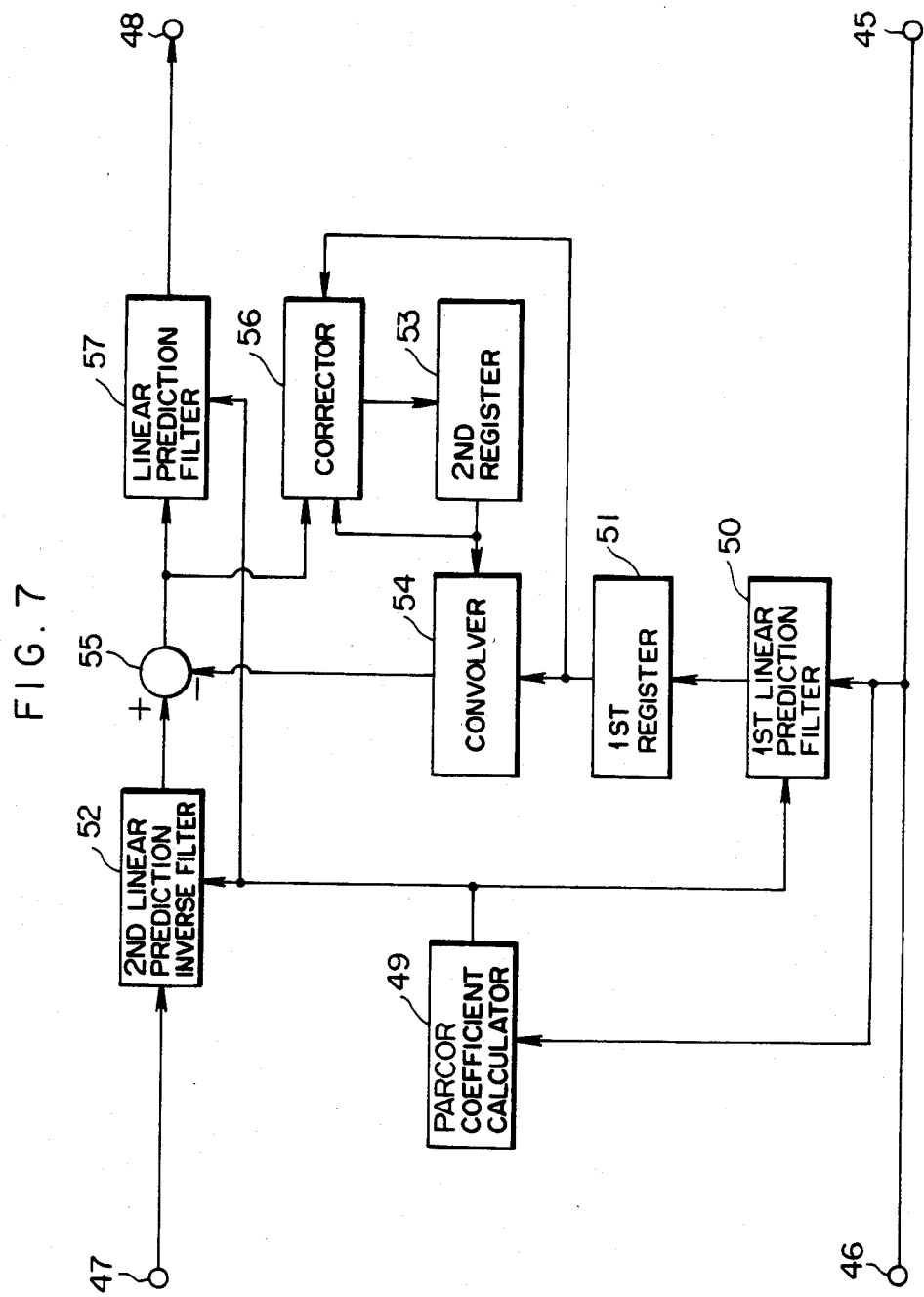
FIG. 7 is a block diagram of an echo canceller of a third embodiment according to the present invention.

FIG. 7 shows an arrangement of an echo canceller in the third embodiment. In FIG. 7, reference numeral 45 designates a receiving side input terminal, 46 a receiving side output terminal, 47 a transmitting side input terminal, 48 a transmitting side output terminal, 49 a PARCOR coefficient calculator, 50 a first linear prediction inverse filter, 51 a first register, 52 a second linear prediction inverse filter, 53 a second register, 54 a convolver, 55 a subtracter, 56 a corrector, and 57 designates a linear prediction filter.

Comparing the operation principle of the first embodiment with that of the third embodiment, the reduction of the correlation in the receiving side input signal based on the linear prediction method is the same in both embodiments although the kinds of linear prediction parameters employed therein differ from each other. In other words, in the first embodiment, linear prediction coefficients are used as a linear prediction parameters, and the third embodiment differs in that PARCOR coefficients are used.

By virtue of the use of the PARCOR coefficients in the third embodiment, an echo canceller can be provided in which the insurance of stability of the linear prediction filter is easy; and the echo canceller operates stably with registers whose word length is even a lower number of bits.

More specifically, when the linear prediction coefficients are used as the linear prediction parameters, the stability insurance of the linear prediction filter is complicated in particular when a prediction of a higher order is carried out. In contrast, when the PARCOR coefficients are used, the stability of the linear prediction filter can easily be insured by making the PARCOR coefficient $k_i$ ($i=1, 2, \ldots, M$) satisfy a relation $|k_i| < 1$.

Further, in the echo canceller using the PARCOR coefficients in the linear prediction filter, as compared with the echo canceller using the linear prediction coefficients, the operation is stable with registers whose word length is even a lower number of bits.

The operation of the third embodiment will be described hereinafter.

First, when a receiving side input signal is inputted, the PARCOR coefficient calculator 49, regarding the receiving side input signal as an output signal of an M-th order linear prediction model, obtains a PARCOR coefficient $k_i$ ($i=1, 2, \ldots, M$). As an algorithm for obtaining the PARCOR coefficients, various methods including Durbin's method, Le Roux's method, Itakura's modified lattice method, etc., are known. However, in the present embodiment, among these methods, the modified lattice method is used, which is suitable for designing hardware in view of the fact that the required amount of memory is the smallest.

In the modified lattice method, the calculations of the PARCOR coefficients and the linear prediction inverse filtering are performed simultaneously, and in the latter, the correlation contained in the input signal is removed by using the input signal and the PARCOR coefficients, and the prediction error signal of the input signal is produced.

Figure 8:
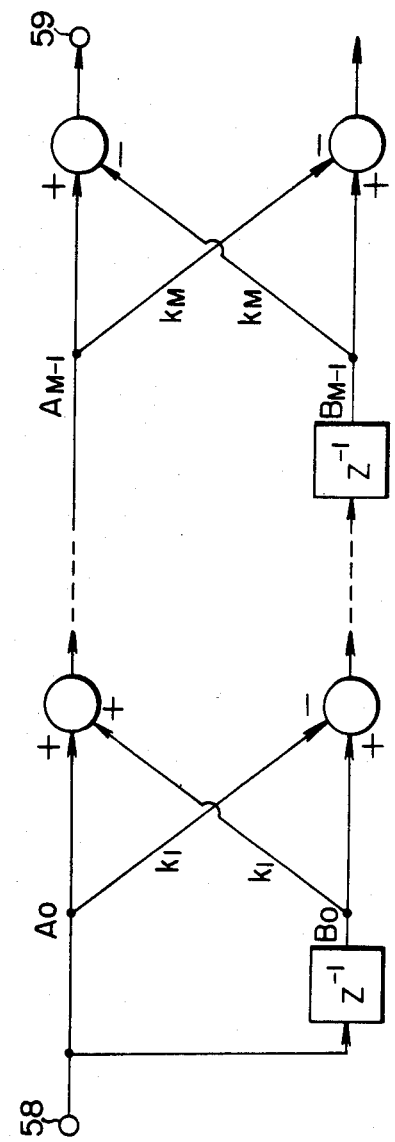
FIG. 8 is a signal flow diagram in a linear prediction inverse filter using PARCOR coefficients.
Figure 9:
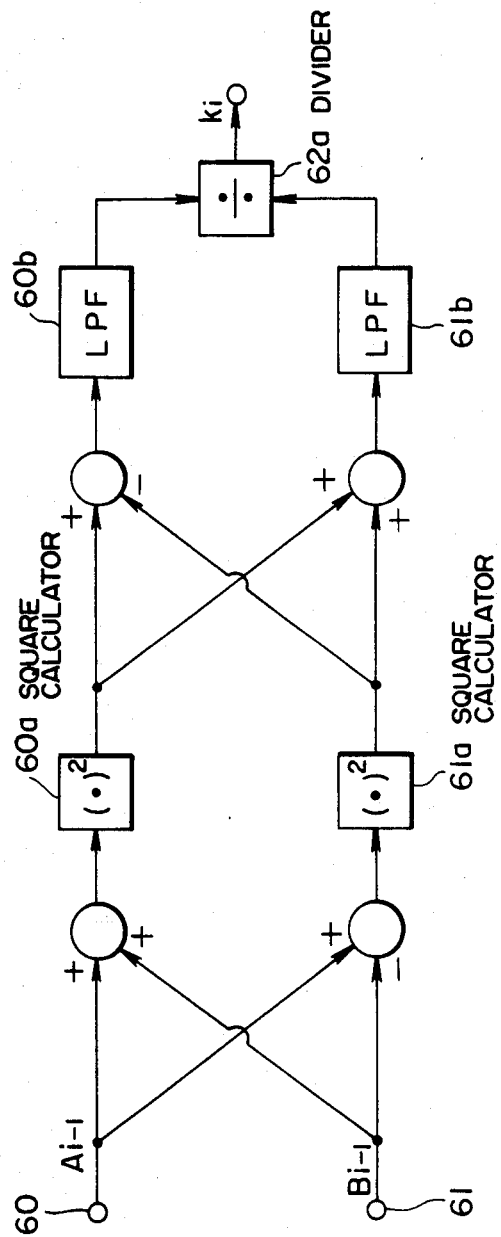
FIG. 9 is a signal flow diagram of an i-th order PARCOR coefficient calculator according to the modified lattice method.

FIG. 8 is a signal flow diagram in the linear prediction inverse filter using the PARCOR coefficients, and FIG. 9 is a signal flow diagram in an i-th order PARCOR coefficient calculator according to the modified lattice method.

In FIG. 8, reference numeral 58 designates a signal input terminal, and 59 designates a prediction error signal output terminal. Letter $A_i(Z)$ represents a system function of an i-th order forward prediction error signal $E_f^{(i)}$ with respect to the input signal, and $B_i(Z)$ represents a system function of an i-th order backward prediction error signal $E_b^{(i)}$ with respect to the input signal.

The signal flow diagram in FIG. 8 represents a recurrence formula of equation (21) using equation (20) as initial values.

$$A_o(Z) = 1, B_o(Z) = Z^{-1} \quad (20)$$

$$\left. \begin{array}{l} A_i(Z) = A_{i-1}(Z) - k_i B_{i-1}(Z) \\ B_i(Z) = Z^{-1}(B_{i-1}(Z) - k_i A_{i-1}(Z)) \\ (1 \leq i \leq M) \end{array} \right\} \quad (21)$$

An M-th order forward prediction error signal $E_f^{(M)}$ is outputted to the prediction error output terminal 59 as an output of the M-th order linear prediction inverse filter.

In FIG. 9, reference numeral 60 designates an (i-1)th order forward prediction error signal input terminal, 61 an (i−1)th order backward prediction error signal input terminal, and 62 designates an i-th order PARCOR coefficient output terminal.

Each terminal of the i-th order PARCOR coefficient calculator shown in FIG. 9 is connected to a corresponding point in FIG. 8, and a first order PARCOR coefficient calculator calculates a first order PARCOR coefficient from an input signal of the linear prediction inverse filter, and next, by using the first order PARCOR coefficient, in a first stage linear prediction inverse filter, first order forward and backward prediction error signals are calculated, and then by using the first order forward and backward prediction error signals, in a second order PARCOR coefficient calculator, a second order PARCOR coefficient is calculated, and then by using the second order PARCOR coefficient, in a second stage linear prediction inverse filter, second order forward and backward prediction error signals are calculated, and so on. By operating in this manner, M PARCOR coefficients and M prediction error signals are calculated.

In FIG. 9, reference numerals 60a, 61a designate square calculators, 60b, 61b designate low-pass filters, and 62a designates a divider.

The i-th order PARCOR coefficient $k_i$ is expressed by equation (22), and FIG. 9 represents the equation (22) in the form of a signal flow diagram.

$$k_i = \frac{2\overline{E_f^{(i-1)} E_b^{(i-1)}}}{\overline{(E_f^{(i-1)})^2} + \overline{(E_b^{(i-1)})^2}} \quad (22)$$

where, the symbol ‾ (bar) represents the mean value of a signal with respect to time (a signal which has passed through a low-pass filter).

The condition for the linear prediction filter using the PARCOR coefficients to operate stably is that a relationship $|k_i| < i$ ($i=1, 2, \ldots, M$) is satisfied. From the equation (22), when the accuracy is infinity, the relationship becomes $|k_i| < 1$. However, in an actual case, sometimes the relationship becomes $|k_i| \geq 1$ due to the influence of finite word length registers. In such a case, by changing over the value of the PARCOR coefficients so that the relationship $|k_i| < 1$ is forcibly attained, the linear prediction filter can always be operated stably.

For this reason, the PARCOR coefficient calculator 49 consists of M PARCOR coefficient calculators (each order of PARCOR coefficient calculator is shown in FIG. 9) and a section for stability decision for insuring stability.

As described above, in the PARCOR coefficient calculator 49, the PARCOR coefficients of the receiving side input signal are calculated, and in the first linear inverse filter 50, the correlation contained in the receiving side input signal is removed by using the receiving side input signal and the PARCOR coefficients, and a prediction error signal $\tilde{x}_j$ receiving side input signal is produced.

In the first register 51, a signal vector $\tilde{X}_j$ of the prediction error signals of the receiving side input signal at a time j obtained in the above manner is stored in the form of equation (4).

In the second linear prediction inverse filter 52, a prediction error signal $\tilde{y}_j$ of a transmitting side input signal is produced by using the PARCOR coefficients calculated in the PARCOR coefficient calculator 49 and the transmitting side input signal.

The operation of the second linear prediction inverse filter 52 is the same as that of the first linear prediction inverse filter 50.

Next, the content of the first register 51 and the content of the second register 53 storing an estimated impulse response of an echo path in the form of formula (2) are convolved as shown in equation (23) by using the convolver 54, and an estimated value $\hat{\tilde{y}}_j$ of a prediction error signal of the echo signal is produced.

$$\hat{\tilde{y}}_j = \hat{H}_j \tilde{X}_j \quad (23)$$

In the subtracter 55, by subtracting the estimated value of the prediction error signal of the echo signal from the prediction error signal of the transmitting side input signal as shown in equation (24), a prediction error signal $\tilde{e}_j$ of the transmitting side output signal is produced.

$$\tilde{e}_j = \tilde{y}_j - \hat{\tilde{y}}_j \quad (24)$$

In the corrector 56, in accordance with the algorithm of the learning identification method shown in equation (25), the estimated impulse response is corrected in sequence by correcting the content of the second register 53 by using the contents of the first register 51 and the second register 53 and the prediction error signal of the transmitting side output signal.

$$\hat{H}_{j+1} = \hat{H}_j + \alpha \frac{\tilde{X}_j \tilde{e}_j}{||\tilde{X}_j||^2} \quad (25)$$

where, $\alpha$ is a constant in a range $0 < \alpha < 2$.

In the linear prediction filter 57, by using the prediction error signal of the transmitting side output signal and the PARCOR coefficients obtained in the PARCOR coefficient calculator 49, correlation is given to the prediction error signal of the transmitting side output signal, and a transmitting side output signal is produced.

Figure 10:
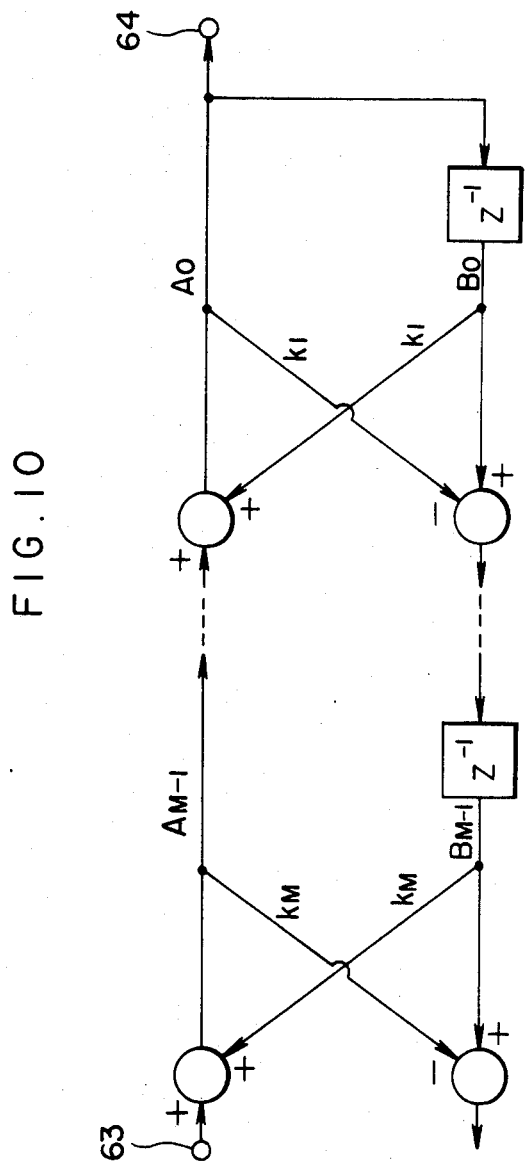
FIG. 10 is a signal flow diagram in a linear prediction filter using the PARCOR coefficients.

FIG. 10 is a signal flow diagram in the linear prediction filter using the PARCOR coefficients. The linear prediction filter shown in FIG. 10 and the linear prediction inverse filter shown in FIG. 8 are in an inverse filter relationship with each other, and the linear prediction filter of FIG. 10 realizes the following equation (26) which is a modification of equation (21).

$$\begin{matrix} A_{i-1}(Z) = A_i(Z) + k_i B_{i-1}(Z) \\ B_i(Z) = Z^{-1}(B_{i-1}(Z) - k_i A_{i-1}(Z)) \\ (1 \leq i \leq M) \end{matrix} \quad (26)$$

In FIG. 10, reference numeral 63 designates a prediction error signal input terminal, and 64 designates a signal output terminal.

The foregoing is a description of the operation of the third embodiment.

The number of calculation and the amount of memory required to realize the third embodiment are substantially equivalent to the second embodiment.

As described in the foregoing, in accordance with the third embodiment, by incorporating a means for reducing the correlation by the linear prediction model, that is, by incorporating the PARCOR coefficient calculator, first and second linear prediction inverse filters, and linear prediction filter, it is possible to provide an echo canceller which exhibits a good convergence characteristic even for the receiving side input signal having strong correlation as in a speech signal. Further, in the present embodiment, it is possible to provide an echo canceller having an arrangement suitable for hardware implementation in which by employing the PARCOR coefficients as parameters of linear prediction, the stability of the linear filter can be insured easily, and the echo canceller can operate stably with registers whose word length is a small number of bits.

A fourth embodiment will be described with reference to the drawings hereinafter.

Figure 11:
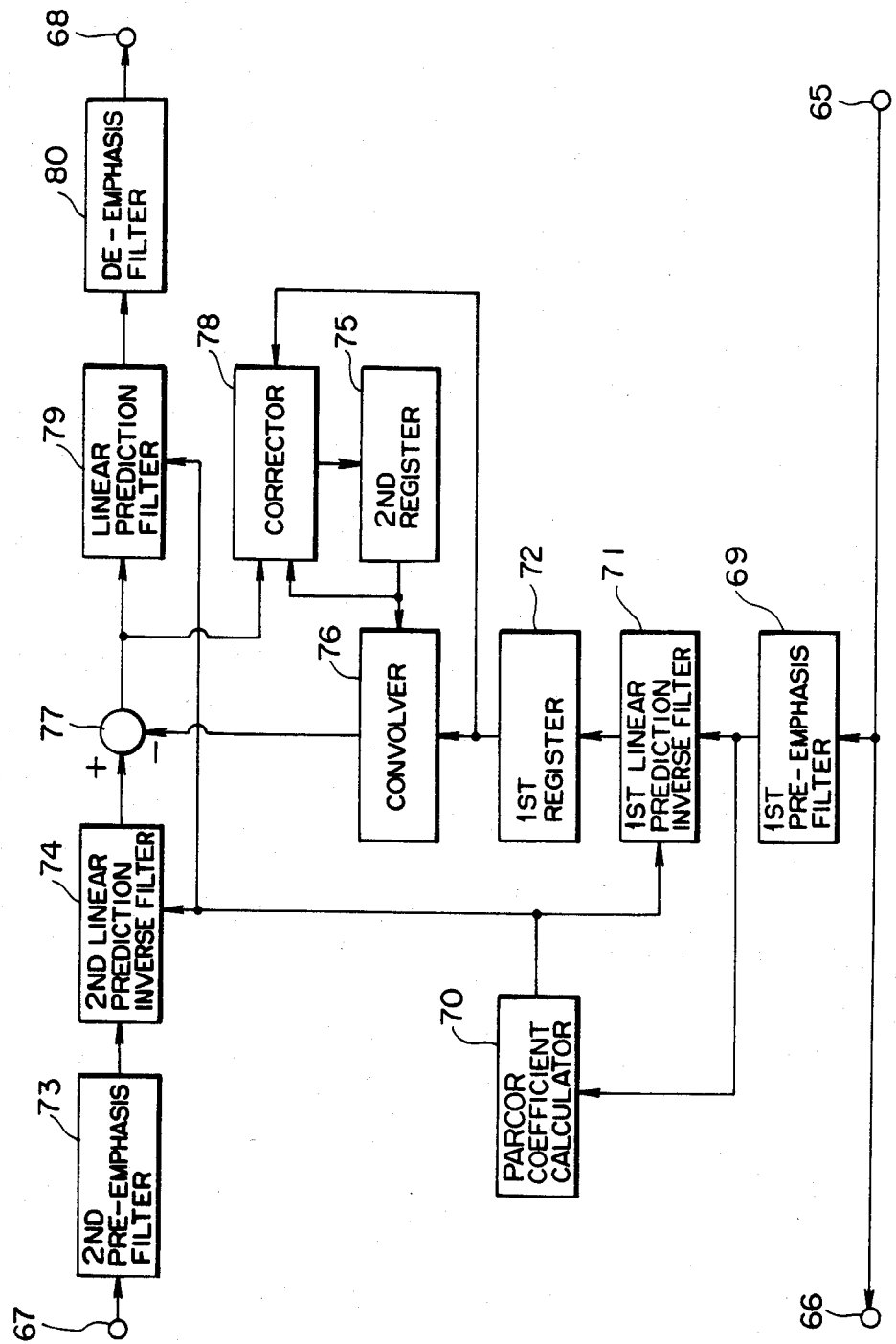
FIG. 11 is a block diagram of an echo canceller of a fourth embodiment according to the present invention.

FIG. 11 shows an arrangement of an echo canceller of the fourth embodiment of the present invention. In FIG. 11, reference numeral 65 designates a receiving side input terminal, 66 a receiving side output terminal, 67 a transmitting side input terminal, 68 a transmitting side output terminal, 69 a first pre-emphasis filter, 70 a PARCOR coefficient calculator, 71 a first linear prediction inverse filter, 72 a first register, 73 a second pre-emphasis filter, 74 a second linear prediction inverse filter, 75 a second register, 76 a convolver, 77 a subtracter, 78 a corrector, 79 a linear prediction filter, and 80 designates a de-emphasis filter.

The arrangement of the fourth embodiment of FIG. 11 differs from that of the third embodiment of FIG. 7 in that in the fourth embodiment, the first and second pre-emphasis filters and the de-emphasis filter are newly provided.

As to the operation of the fourth embodiment, different points from the third embodiment will be described hereinafter.

The first pre-emphasis filter 69 is fed with a receiving side input signal as an input signal and emphasizes a particular frequency region thereof, for example, a high frequency region. The input signals to the PARCOR coefficient calculator 70 and the first linear prediction inverse filter 71 are the receiving side input signals which have passed this first pre-emphasis filter 69.

Figure 12:
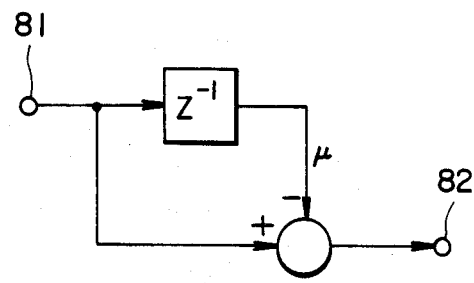
FIG. 12 is a signal flow diagram in a preemphasis filter.

FIG. 12 is an example of a signal flow diagram in the pre-emphasis filter 69 which emphasizes the high frequency region. In FIG. 12, reference numeral 81 designates a signal input terminal, and 82 designates a signal output terminal. A system function F(Z) of the pre-emphasis filter shown in FIG. 12 is given by equation (27).

$$F(Z) = 1 - \mu Z^{-1} \quad (27)$$

where, $\mu$ represents a constant which determines the degree of pre-emphasis, and in case of a speed signal, it is selected, for example, to be $\mu = 0.9375$.

The second pre-emphasis filter 73 is a filter which has the same characteristic as the first pre-emphasis filter 69, and is fed with a transmitting side input signal as an input signal and emphasizes a high frequency region thereof. The input signal to the second linear prediction inverse filter 74 is the transmitting side input signal which has passed through this second pre-emphasis filter 73.

The de-emphasis filter 80 is an inverse filter of the first pre-emphasis filter 69, and is fed with an output signal of the linear prediction filter 79 as an input, and produces a transmitting side output signal by suppressing the high frequency region of the input.

Figure 13:
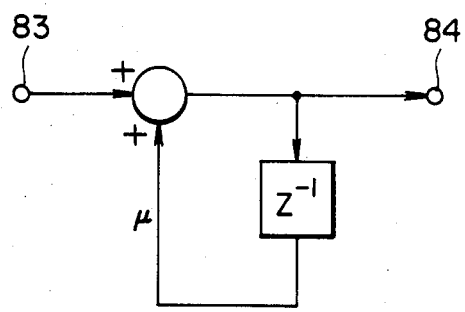
FIG. 13 is a signal flow diagram in a deemphasis filter.

FIG. 13 is a signal flow diagram in the de-emphasis filter 80. In FIG. 13, reference numeral 83 designates a signal input terminal, and 84 designates a signal output terminal. The de-emphasis filter of FIG. 13 is in an inverse filter relationship with the pre-emphasis filter of FIG. 12, and thus a system function G(Z) is given by equation (28).

$$G(Z) = \frac{1}{1 - \mu Z^{-1}} = \frac{1}{F(Z)} \quad (28)$$

In the fourth embodiment as described above, by providing the first and second pre-emphasis filters and the de-emphasis filter, the general shape of the spectrum of the receiving side input signal can be made flat, and the calculations of the PARCOR coefficients are carried out with respect to the input signal whose spectrum has a general shape which is flattened. Consequently, as compared with the case in which the above-mentioned filters are not used, the calculation accuracy inside the PARCOR coefficient calculator can be reduced by 3 to 4 bits.

In the fourth embodiment, the first and second pre-emphasis filters and the de-emphasis filter are added to the arrangement of the third embodiment. However, in the same manner, the first and second pre-emphasis filters and the de-emphasis filter may be added to the arrangement of the first embodiment and the second embodiment.

In the third and fourth embodiments, the linear prediction filter and the linear prediction inverse filter are designed to use the PARCOR coefficients. However, a linear prediction filter and a linear prediction inverse filter using linear prediction coefficients instead of PARCOR coefficients may be employed in which the PARCOR coefficients are converted into the linear prediction coefficients after the PARCOR coefficients have been calculated and the stability of the filter has been insured.

Further, in the embodiment described above, although the algorithm according to the learning identification method is used as an algorithm for sequential estimation of an impulse response, other algorithms, for example, an algorithm according to the steepest descent method may be used.

As described in the foregoing, in the present invention, the means for reducing the correlation based on the linear prediction model is made suitable for hardware implementation. Accordingly, it is possible to provide an echo canceller exhibiting a good convergence characteristic even for the receiving side input signal having strong correlation as in a speech signal, without substantially increasing the number of calculations or the amount of memory.

Figure 14:
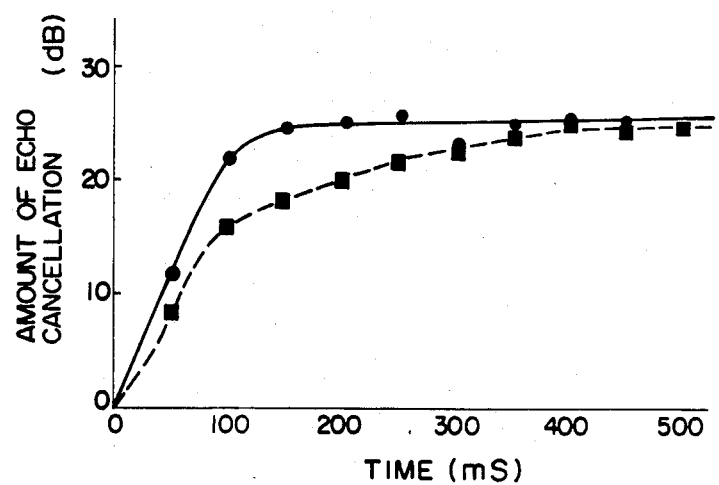
FIG. 14 is a convergence characteristic of the echo canceller for a conventional telephone signal.

FIG. 14 shows an example of the results of experiments relating to the convergence characteristic of an echo canceller for a conventional telephone signal specified in REC G.227 of CCITT. In FIG. 14, a solid line curve indicates the convergence characteristic of an echo canceller provided with the means for reducing the correlation based on the linear prediction model, and the dotted line curve indicates a convergence characteristic of the echo canceller having no such means. Principal parameters of the echo canceller used in the experiment include; sampling frequency =8 kHz, N=128, and α=1. From FIG. 14, the advantageous effects of providing the means for reducing the correlation by the linear prediction model will be apparent.

Further, in the echo canceller using the adaptive linear prediction inverse filter, it is possible to make the algorithm for calculating the linear prediction coefficients of the above-mentioned filter the same as the algorthm for sequential estimation of the impulse response of the echo canceller main body, and by doing so, there is an advantage in that common hardware and software can be used for both.

In the echo canceller using the PARCOR coefficients as a parameter of the linear prediction, stable operation of the linear prediction filter can be insured easily, and the echo canceller can operate stably with registers whose word length is a small number of bits.

Further, in the echo canceller provided with the pre-emphasis filters and the de-emphasis filter, as compared with the echo canceller having no such filters, it is possible to reduce the calculation accuracy by 3 to 4 bits.

The echo canceller according to the present invention is also effective in other cases in which the estimation of a transmission system is carried out by using a signal itself having high correlation such as a speech signal or the like, and for example, it is applicable to prevent howling in a speakerphone, and to prevent ringing on a two-way repeater in the telephone system and the like.

We claim:

1. An echo canceller for cancelling an echo signal transmitted along an echo path, the signals within said echo canceller being sampled in time to provide discrete time signals, comprising a linear prediction coefficient calculator for obtaining linear prediction coefficients of a receiving side input signal, said calculator including a linear prediction model for generating said coefficients;

a first linear prediction inverse filter for self correlating said linear prediction coefficients and said receiving side input signal, said first inverse filter producing a first prediction error signal of said receiving side input signal;

a first register for storing said first prediction error signal;

a second linear prediction inverse filter for self correlating said linear prediction coefficients and a transmitting side input signal, said second inverse filter producing a second prediction error signal of said transmitting side input signal;

a second register for storing an estimated impulse response of said echo path;

a convolver for convolving the content of said first register with the content of said second register, the output of said convoler being an estimated value of a prediction error signal of said echo signal;

a subtracter for subtracting said estimated value of the prediction error signal of said echo signal from said second prediction error signal;

a corrector for receiving the contents of said first and second registers and the output of said subtracter, said corrector correcting in sequence at every sampling period of said echo signal said estimated impulse response of said echo path by correcting the content of said second register; and a linear prediction filter for self correlating said linear prediction coefficients and the output of said substracter, said linear prediction filter producing a transmitting side output signal.

2. An echo canceller according to claim 1 wherein said linear prediction coefficient calculator and said first linear prediction inverse filter comprise an adaptive linear prediction inverse filter, said adaptive linear prediction inverse filter calculating said linear prediction coefficients and simulantaneously producing said first prediction error signal of said receiving side input signal.

3. An echo canceller for cancelling an echo signal transmitted along an echo path, the signals within said echo canceller being sampled in time to provide discrete time signals, comprising a first pre-emphasis filter for emphasizing a particular frequency region of a receiving side input signal;

a linear prediction coefficient calculator for obtaining linear prediction coefficients of the output of said first pre-emphasis filter, said calculator including a linear prediction model for generating said coefficients;

a first linear prediction inverse filter for self correlating said linear prediction coefficients and the output of said first pre-emphasis filter, said first inverse filter producing a first prediction error signal of said receiving side input signal;

a first register for storing said first prediction error signal;

a second pre-emphasis filter having the same frequency characteristics as said first pre-emphasis filter for emphasizing said particular region of a transmitting side input signal;

a second linear prediction inverse filter for self correlating said linear prediction coefficients and the output of said second pre-emphasis filter, said second inverse filter producing a second prediction error signal of said tramsmitting side input signal;

a second register for storing an estimated impulse response of said echo path;

a convolver for convolving the content of said first register with the content of said second register, the output of said convolver being in estimated value of a prediction error signal of said echo signal;

a subtracter for subtracting said estimated value of the prediction error signal of said echo signal from said second prediction error signal;

a corrector for receiving the contents of said first and second registers and the output of said subtracter, said corrector correcting in sequence at every sampling period of said echo signal said estimated impulse response of said echo path by correcting the content of said second register:

a linear prediction filter for self correlating said linear prediction coefficients and the output of said subtracter, said liner prediction filter producing an output signal; and a de-emphasis filter receiving the output signal of said linear prediction filter and having a frequency characteristic which is the inverse of the frequency characteristic of said first pre-emphasis filter, said de-emphasis filter producing a transmitting side output signal by suppressing said particular frequency region.

4. An echo canceller according to claim 3 wherein said linear prediction coefficient calculator and said first linear prediction inverse filter comprise an adaptive linear prediction inverse filter, said adaptive linear prediction inverse filter calculating said linear prediction coefficients and simulantaneously producing said first prediction error signal of said receiving side input signal.

5. An echo canceller for cancelling an echo signal transmitted along an echo path, the signals within said echo canceller being sampled in time to provide discrete time signals, comprising a PARCOR coefficient calculator for obtaining PARCOR coefficients of a receiving side input signal, said calculator including a PARCOR model for generating said coefficients;

a first linear prediction inverse filter for self correlating said PARCOR coefficients and said receiving side input signal, said first inverse filter producing a first prediction error signal of said receiving side input signal;

a first register for storing said first prediction error signal;

a second linear prediction inverse filter for self correlating said PARCOR coefficients and a transmitting side input signal, said second inverse filter producing a second prediction error signal of said transmitting side input signal;

a second register for storing an estimated impulse response of said echo path;

a convolver for convolving the content of said first register with the content of said second register, the output of said convolver being an estimated value of a prediction error signal of said echo signal;

a substracter for subtracting said estimated value of the prediction error signal of said echo signal from said second prediction error signal;

a corrector for receiving the contents of said first and second registers and the output of said subtracter, said corrector correcting in sequence at every sampling period of said echo signal said estimated impulse response of said echo path by correcting the content of said second register; and a linear prediction filter for self correlating said PARCOR coefficients and the output of said subtracter, said linear prediction filter producing a transmitting side output signal.

6. An echo canceller according to claim 5 further comprising:

a first pre-emphasis filter for emphasizing a particular frequency region of said receiving side input signal, said first pre-emphasis filter coupling said receiving side input signal to said PARCOR coefficient calculator and to said first linear prediction inverse filter;

a second pre-emphasis filter having the same frequency characteristic as said first pre-emphasis filter for emphasizing said particular frequency region of said transmitting side input signal, said second pre-emphasis filter coupling said transmitting side input signal to said second linear prediction inverse filter; and a de-emphasis filter receiving the output signal of said linear prediction filter, said de-emphasis filter producing said transmitting side output signal by suppressing said particular frequency region.

* * * * *